(12) United States Patent
Liu

(10) Patent No.: US 10,075,870 B2
(45) Date of Patent: Sep. 11, 2018

(54) MOBILE COMMUNICATIONS NETWORK DETECTION METHOD AND APPARATUS

(71) Applicant: Huawei Technologies Co., Ltd., Shenzhen (CN)

(72) Inventor: Huiyong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 15/235,437

(22) Filed: Aug. 12, 2016

(65) Prior Publication Data

US 2016/0353318 A1    Dec. 1, 2016

Related U.S. Application Data

(63) Continuation of application No. PCT/CN2014/072045, filed on Feb. 13, 2014.

(51) Int. Cl.
*H04L 1/00* (2006.01)
*H04W 28/02* (2009.01)
(Continued)

(52) U.S. Cl.
CPC ......... *H04W 28/0268* (2013.01); *H04L 41/00* (2013.01); *H04L 41/50* (2013.01);
(Continued)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS

2003/0202468 A1    10/2003  Cain
2007/0291745 A1    12/2007  Baten et al.
(Continued)

FOREIGN PATENT DOCUMENTS

CN    1335007 A    2/2002
CN    101569137 A    10/2009
(Continued)

OTHER PUBLICATIONS

SA WG5, "Reply LS on MDT parameters related UE measurement clarification," R2-110035, 3GPP TSG RAN WG2 Meeting #72bis, Dublin, Ireland, Jan. 17-21, 2011, 103 pages.
(Continued)

*Primary Examiner* — Dady Chery

(57) ABSTRACT

Embodiments of the present invention provide a mobile communications network detection method and apparatus. The mobile communications network detection method comprises: receiving, by a network element management device, quality of service information sent by multiple network element devices on a transmission path of a service data flow, where the quality of service information is used for indicating quality of service of transmission of the service data flow by the network element devices, and the multiple network element devices include a base station device and a core network device; and determining, by the network element management device, quality of service of the transmission path of the service data flow according to the quality of service information sent by the multiple network element devices. The mobile communications network detection method and apparatus provided in the embodiments of the present invention are used to efficiently detect quality of service of service transmission.

20 Claims, 10 Drawing Sheets

(51) Int. Cl.
  *H04W 76/12*  (2018.01)
  *H04L 12/24*  (2006.01)
  *H04L 12/26*  (2006.01)
  *H04W 28/24*  (2009.01)
  *H04W 76/02*  (2009.01)

(52) U.S. Cl.
  CPC .......... *H04L 41/5035* (2013.01); *H04L 43/06* (2013.01); *H04L 43/10* (2013.01); *H04W 28/24* (2013.01); *H04W 76/022* (2013.01); *H04W 76/12* (2018.02); *H04L 41/142* (2013.01); *H04L 41/5032* (2013.01); *H04L 41/5067* (2013.01); *H04L 43/062* (2013.01); *H04L 43/12* (2013.01)

(58) Field of Classification Search
  CPC ............. H04W 28/02; H04W 28/0205; H04W 28/021; H04W 28/0247; H04W 28/0252; H04W 28/0257; H04W 28/0263; H04W 28/0268; H04W 28/0273
  USPC ................................ 370/230, 235, 236, 392
  See application file for complete search history.

(56) References Cited

U.S. PATENT DOCUMENTS

| | | |
|---|---|---|
| 2008/0220792 A1 | 9/2008 | Fischer |
| 2009/0201884 A1 | 8/2009 | Chaponniere |
| 2012/0236713 A1* | 9/2012 | Kakadia .............. H04L 41/5025 370/230 |

FOREIGN PATENT DOCUMENTS

| | | |
|---|---|---|
| CN | 101616457 A | 12/2009 |
| CN | 102083134 A | 6/2011 |
| CN | 102447980 A | 5/2012 |
| CN | 103312612 A | 9/2013 |
| EP | 1619917 A1 | 1/2006 |
| EP | 2071778 A2 | 6/2009 |
| JP | 2004056787 A | 2/2004 |
| JP | 2011172063 A | 9/2011 |
| RU | 2420883 C2 | 6/2011 |
| WO | 00/33511 A1 | 6/2000 |
| WO | 2012/000337 A1 | 1/2012 |
| WO | 2013/066333 A1 | 5/2013 |

OTHER PUBLICATIONS

"3rd Generation Partnership Project; Technical Specification Group Services and System Aspects; Telecommunication management; Subscriber and equipment trace; Trace control and configuration management (Release 11)", 3GPP TS 32.422 V11.8.0, Jun. 2013, 133 pages.

* cited by examiner

MOBILE COMMUNICATIONS NETWORK DETECTION METHOD AND APPARATUS

CROSS-REFERENCE TO RELATED APPLICATIONS

This application is a continuation of International Application No. PCT/CN2014/072045, filed on Feb. 13, 2014, which is hereby incorporated by reference in its entirety.

TECHNICAL FIELD

Embodiments of the present invention relate to communications technologies, and in particular, to a mobile communications network detection method and apparatus.

BACKGROUND

To enhance competitiveness of a future network, The 3rd Generation Partnership Project (3GPP) launches a completely new evolved network, which is named a System Architecture Evolution (SAE) system.

An architecture of the SAE system spans multiple different fields and devices; therefore, a service in the SAE system also spans different devices in different fields. However, network operation and maintenance for the SAE system still stay at a basic level based on maintenance of a single network element, and operation and maintenance for a single device are provided by an element management system (EMS). This operation and maintenance manner based on a single network element already cannot meet needs of operation and maintenance. To improve a network operation and maintenance level, visual operation and maintenance based on end to end (E2E) will become potential needs.

A 3GPP standard defines a feature of network-wide trace, namely, E2E trace, which provides trace for a signaling procedure. The E2E trace may be used in operation and maintenance diagnosis in aspects of service access and service maintenance, thereby implementing E2E visual operation and maintenance for a signaling procedure. However, for a problem in terms of experience of user service completeness, for example, a problem that a packet loss results in voice call interruption or even silence, a technical means, such as capturing a traced user packet inside a network element, or capturing a packet by using an interface probe outside a network element and performing analysis, needs to be used to check and diagnose the network element and the interface one by one. A manner of excluding a network element or an interface one by one is time-consuming and troublesome, and requires a relatively long time for locating, thereby resulting in relatively low operation and maintenance efficiency.

SUMMARY

Embodiments of the present invention provide a mobile communications network detection method and apparatus, which are used to efficiently detect quality of service of service transmission.

A first aspect provides a network operation and maintenance method, including:

receiving, by a network element management device, quality of service information sent by multiple network element devices on a transmission path of a service data flow, where the quality of service information is used for indicating quality of service of transmission of the service data flow by the network element devices, and the multiple network element devices include a base station device and a core network device; and determining, by the network element management device, quality of service of the transmission path of the service data flow according to the quality of service information sent by the multiple network element devices.

In a first possible implementation manner of the first aspect, when the service data flow is an uplink data flow, the quality of service information sent by the base station device is quality of service information of a received PDCP data packet carrying the service data flow.

With reference to the first aspect or the first possible implementation manner of the first aspect, in a second possible implementation manner, when the service data flow is a downlink data flow, the quality of service information sent by the base station device is quality of service information of a received GTP data packet carrying the service data flow and quality of service information of a sent PDCP data packet carrying the service data flow.

With reference to any possible implementation manner in the first aspect to the second possible implementation manner of the first aspect, in a third possible implementation manner, the quality of service information sent by the core network device is the quality of service information of the received GTP data packet carrying the service data flow.

In a fourth possible implementation manner of the first aspect, when the service data flow is an uplink data flow, the quality of service information sent by the base station device and the core network device is quality of service information of a received data packet that is of a service protocol and carries the service data flow, where the service protocol is based on a service attribute of the service data flow.

With reference to the first aspect or the fourth possible implementation manner of the first aspect, in a fifth possible implementation manner, when the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on a service attribute of the service data flow.

With reference to the fourth or the fifth possible implementation manner of the first aspect, in a sixth possible implementation manner, the service protocol includes the RIP.

With reference to any possible implementation manner in the first aspect to the sixth possible implementation manner of the first aspect, in a seventh possible implementation manner, the determining, by the network element management device, quality of service of the transmission path of the service data flow according to the quality of service information sent by the multiple network element devices includes:

determining, by the network element management device according to the quality of service information sent by the multiple network element devices, a network element device having the lowest quality of service on the transmission path of the service data flow.

With reference to any possible implementation manner in the first aspect to the seventh possible implementation manner of the first aspect, in an eighth possible implementation manner, the method further includes:

generating, by the network element management device, a statistical diagram according to the quality of service information sent by the multiple network element devices, where the statistical diagram is used for indicating a change situation of the quality of service of the transmission path.

With reference to any possible implementation manner in the first aspect to the eighth possible implementation manner of the first aspect, in a ninth possible implementation manner, the method further includes:

sending, by the network element management device, detection indication information to the multiple network element devices, where the detection indication information is used for indicating detection of the quality of service of the transmission of the service data flow by the network element devices.

With reference to the ninth possible implementation manner of the first aspect, in a tenth possible implementation manner, the sending, by the network element management device, detection indication information to the multiple network element devices includes:

sending, by the network element management device, end-to-end trace session activation signaling to a network control network element, where the end-to-end trace session activation signaling includes the detection indication information, so that the network control network element sends the detection indication information to the multiple network element devices; or sending, by the network element management device, end-to-end trace session activation signaling to a home subscriber server, so that after the home subscriber server sends the detection indication information to a network control network element, the network control network element sends the detection indication information to the multiple network element devices.

With reference to the tenth possible implementation manner of the first aspect, in an eleventh possible implementation manner, the end-to-end trace session activation signaling further includes information about a network element device to be detected, so that the network control network element sends the detection indication information to the network element device to be detected.

With reference to the tenth or the eleventh possible implementation manner of the first aspect, in a twelfth possible implementation manner, the end-to-end trace session activation signaling further includes a job type information element, and the job type information element is used for instructing the multiple network element devices to send a trace signaling message and/or the detection indication information to the network element management device.

With reference to any possible implementation manner in the first aspect to the twelfth possible implementation manner of the first aspect, in a thirteenth possible implementation manner, the core network device includes a serving gateway and a data gateway.

With reference to any possible implementation manner in the first aspect to the thirteenth possible implementation manner of the first aspect, in a fourteenth possible implementation manner, the quality of service information includes a packet loss rate, jitter, latency or a MOS value of a data packet.

A second aspect provides a mobile communications network detection apparatus, including:

a receiving module, configured to receive quality of service information sent by multiple network element devices on a transmission path of a service data flow, where the quality of service information is used for indicating quality of service of transmission of the service data flow by the network element devices, and the multiple network element devices include a base station device and a core network device; and a processing module, configured to determine quality of service of the transmission path of the service data flow according to the quality of service information sent by the multiple network element devices.

In a first possible implementation manner of the second aspect, when the service data flow is an uplink data flow, the quality of service information sent by the base station device is quality of service information of a received PDCP data packet carrying the service data flow.

With reference to the second aspect or the first possible implementation manner of the second aspect, in a second possible implementation manner, when the service data flow is a downlink data flow, the quality of service information sent by the base station device is quality of service information of a received GTP data packet carrying the service data flow and quality of service information of a sent PDCP data packet carrying the service data flow.

With reference to any possible implementation manner in the second aspect to the second possible implementation manner of the second aspect, in a third possible implementation manner, the quality of service information sent by the core network device is the quality of service information of the received GTP data packet carrying the service data flow.

In a fourth possible implementation manner of the second aspect, when the service data flow is an uplink data flow, the quality of service information sent by the base station device and the core network device is quality of service information of a received data packet that is of a service protocol and carries the service data flow, where the service protocol is based on a service attribute of the service data flow.

With reference to the second aspect or the fourth possible implementation manner of the second aspect, in a fifth possible implementation manner, when the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on a service attribute of the service data flow.

With reference to the fourth or the fifth possible implementation manner of the second aspect, in a sixth possible implementation manner, the service protocol includes the RTP.

With reference to any possible implementation manner in the second aspect to the sixth possible implementation manner of the second aspect, in a seventh possible implementation manner, the processing module is specifically configured to determine, according to the quality of service information sent by the multiple network element devices, a network element device having the lowest quality of service on the transmission path of the service data flow.

With reference to any possible implementation manner in the second aspect to the seventh possible implementation manner of the second aspect, in an eighth possible implementation manner, the mobile communications network detection apparatus further includes:

a generating module, configured to generate a statistical diagram according to the quality of service information sent by the multiple network element devices, where the statistical diagram is used for indicating a change situation of the quality of service of the transmission path.

With reference to any possible implementation manner in the second aspect to the eighth possible implementation manner of the second aspect, in a ninth possible implementation manner, the mobile communications network detection apparatus further includes:

a sending module, configured to send detection indication information to the multiple network element devices, where the detection indication information is used for indicating detection of the quality of service of the transmission of the service data flow by the network element devices.

With reference to the ninth possible implementation manner of the second aspect, in a tenth possible implementation manner, the sending module is specifically configured to send end-to-end trace session activation signaling to a network control network element, where the end-to-end trace session activation signaling includes the detection indication information, so that the network control network element sends the detection indication information to the multiple network element devices; or send end-to-end trace session activation signaling to a home subscriber server, so that after the home subscriber server sends the detection indication information to a network control network element, the network control network element sends the detection indication information to the multiple network element devices.

With reference to the tenth possible implementation manner of the second aspect, in an eleventh possible implementation manner, the end-to-end trace session activation signaling further includes information about a network element device to be detected, so that the network control network element sends the detection indication information to the network element device to be detected.

With reference to the tenth or the eleventh possible implementation manner of the second aspect, in a twelfth possible implementation manner, the end-to-end trace session activation signaling further includes a job type information element, and the job type information element is used for instructing the multiple network element devices to send a trace signaling message and/or the detection indication information to the network element management device.

With reference to any possible implementation manner in the second aspect to the twelfth possible implementation manner of the second aspect, in a thirteenth possible implementation manner, the core network device includes a serving gateway and a data gateway.

With reference to any possible implementation manner in the second aspect to the thirteenth possible implementation manner of the second aspect, in a fourteenth possible implementation manner, the quality of service information includes a packet loss rate, jitter, latency or a MOS value of a data packet.

A third aspect provides a mobile communications network detection apparatus, including:

a receiver, configured to receive quality of service information sent by multiple network element devices on a transmission path of a service data flow, where the quality of service information is used for indicating quality of service of transmission of the service data flow by the network element devices, and the multiple network element devices include a base station device and a core network device; and a processor, configured to determine quality of service of the transmission path of the service data flow according to the quality of service information that is sent by the multiple network element devices and received by the receiver.

In a first possible implementation manner of the third aspect, when the service data flow is an uplink data flow, the quality of service information sent by the base station device is quality of service information of a received PDCP data packet carrying the service data flow.

With reference to the third aspect or the first possible implementation manner of the third aspect, in a second possible implementation manner, when the service data flow is a downlink data flow, the quality of service information sent by the base station device is quality of service information of a received GTP data packet carrying the service data flow and quality of service information of a sent PDCP data packet carrying the service data flow.

With reference to any possible implementation manner in the third aspect to the second possible implementation manner of the third aspect, in a third possible implementation manner, the quality of service information sent by the core network device is the quality of service information of the received GTP data packet carrying the service data flow.

In a fourth possible implementation manner of the third aspect, when the service data flow is an uplink data flow, the quality of service information sent by the base station device and the core network device is quality of service information of a received data packet that is of a service protocol and carries the service data flow, where the service protocol is based on a service attribute of the service data flow.

With reference to the third aspect or the fourth possible implementation manner of the third aspect, in a fifth possible implementation manner, when the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on a service attribute of the service data flow.

With reference to the fourth or the fifth possible implementation manner of the third aspect, in a sixth possible implementation manner, the service protocol includes the RTP.

With reference to any possible implementation manner in the third aspect to the sixth possible implementation manner of the third aspect, in a seventh possible implementation manner, the processor is specifically configured to determine, according to the quality of service information that is sent by the multiple network element devices and received by the receiver, a network element device having the lowest quality of service on the transmission path of the service data flow.

With reference to any possible implementation manner in the third aspect to the seventh possible implementation manner of the third aspect, in an eighth possible implementation manner, the processor is further configured to generate a statistical diagram according to the quality of service information that is sent by the multiple network element devices and received by the receiver, where the statistical diagram is used for indicating a change situation of the quality of service of the transmission path.

With reference to any possible implementation manner in the third aspect to the eighth possible implementation manner of the third aspect, in a ninth possible implementation manner, the mobile communications network detection apparatus further includes:

a sender, configured to send detection indication information to the multiple network element devices, where the detection indication information is used for indicating detection of the quality of service of the transmission of the service data flow by the network element devices.

With reference to the ninth possible implementation manner of the third aspect, in a tenth possible implementation manner, the sender is specifically configured to send end-to-end trace session activation signaling to a network control network element, where the end-to-end trace session activation signaling includes the detection indication information, so that the network control network element sends the detection indication information to the multiple network element devices; or send end-to-end trace session activation signaling to a home subscriber server, so that after the home subscriber server sends the detection indication information to a network control network element, the network control network element sends the detection indication information to the multiple network element devices.

With reference to the tenth possible implementation manner of the third aspect, in an eleventh possible implementation manner, the end-to-end trace session activation signaling further includes information about a network element device to be detected, so that the network control network element sends the detection indication information to the network element device to be detected.

With reference to the tenth or the eleventh possible implementation manner of the third aspect, in a twelfth possible implementation manner, the end-to-end trace session activation signaling further includes a job type information element, and the job type information element is used for instructing the multiple network element devices to send a trace signaling message and/or the detection indication information to the network element management device.

With reference to any possible implementation manner in the third aspect to the twelfth possible implementation manner of the third aspect, in a thirteenth possible implementation manner, the core network device includes a serving gateway and a data gateway.

With reference to any possible implementation manner in the third aspect to the thirteenth possible implementation manner of the third aspect, in a fourteenth possible implementation manner, the quality of service information includes a packet loss rate, jitter, latency or a MOS value of a data packet.

For the mobile communications network detection method and apparatus provided in the embodiments of the present invention, an element management system receives quality of service information that is sent by multiple network element devices on a transmission path of a service data flow and is of transmission of the service data flow, so that the element management system can quickly detect quality of service of the transmission of the service data flow by comparing the quality of service information of the transmission of the service data flow by the network element devices, thereby facilitating quick locating of a problem, improving operation and maintenance efficiency in terms of service experience, and reducing operation and maintenance cost.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

After a mobile communications network evolves into an SAE system, a case occurs in the system, that is, networks such as a Long Term Evolution LTE) network, an IP multimedia subsystem (IMS) network, and a Global System for Mobile Communications GSM) Enhanced Data Rate for GSM Evolution EDGE) radio communications network/ terrestrial radio access network (GERAN/UTRAN, G/U) network coexist. For a service such as a voice service in an LTE network, because of an E2E attribute of the service, the service may span different fields such as the LTE, an evolved packet core (EPC), the IMS, a public switched telephone network (PSTN), and the G/U. A conventional network operation and maintenance method may trace signaling by using an E2E Trace procedure and may be used for operation and maintenance diagnosis in aspects of service access and service maintenance; however, because a problem of quality of service of end-to-end service transmission involves multiple network element devices in a whole service transmission path, and currently only a technical means such as packet capturing and analysis of a single network element can be used, detection efficiency is low.

An embodiment of the present invention provides a mobile communications network detection method to solve a problem of relatively low efficiency of detection of quality of service involving end-to-end service transmission in the prior art. The mobile communications network detection method provided in this embodiment of the present invention is not limited by a network type, and the mobile communications network detection method provided in this embodiment of the present invention can be used in any type of mobile communications network to efficiently detect quality of service of end-to-end service transmission.

Figure 1:
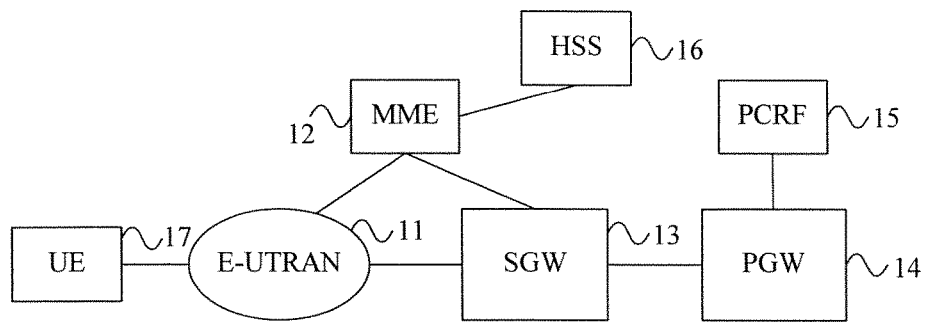
FIG. 1 is a schematic diagram of an architecture of an LTE network in an SAE system.

FIG. 1 is a schematic diagram of an architecture of an LTE network in an SAE system. As shown in FIG. 1, the following network elements are included:

an evolved universal terrestrial radio access network (E-UTRAN) 11, used to implement all functions related to an evolved radio network;

a mobility management entity (MME) 12, responsible for mobility management of a control plane, including user context and mobile status management, allocation of a temporary user identity, and the like;

a serving gateway entity (Serving Gateway, SGW) 13, which is a user plane anchor between 3GPP access systems and terminates an interface with an E-UTRAN interface;

a packet data gateway entity (PDN Gateway, PGW) 14, which is a user plane anchor between a 3GPP access system and a non-3GPP access system and terminates an interface with an external packet data network (PDN);

a policy and charging rule function entity (Policy and Charging Rule Function, PCRF) 15, used for policy control decision and flow charging control functions;

a home subscriber server (HSS) 16, used to store user subscription information, where the HSS 16 is connected to the MME 12 by using an S6a interface, the MME 12 is connected to the E-UTRAN 11 by using an S1-MME interface, the MME 12 is connected to the SGW 13 by using an S11 interface, the E-UTRAN 11 is connected to the SGW 13 by using an S1-U interface, the SGW 13 is connected to the PGW 14 by using an S5/S8 interface, and the PGW is connected to the PCRF; and a user equipment (UE) 17 accesses a network through the E-UTRAN 11.

After a mobile network evolves from a G/U network to an LTE network, a traditional circuit switched (CS) network is also switched to the LTE network to carry a voice service. Compared with an ordinary LTE data service that spans only two fields, namely, LTE and EPC, an LTE voice service may span different fields such as LTE, EPC, IMS, PSTN, and G/U because of an E2E attribute of the LTE voice service; therefore, operation and maintenance for the LTE voice service is more complex.

Figure 2:
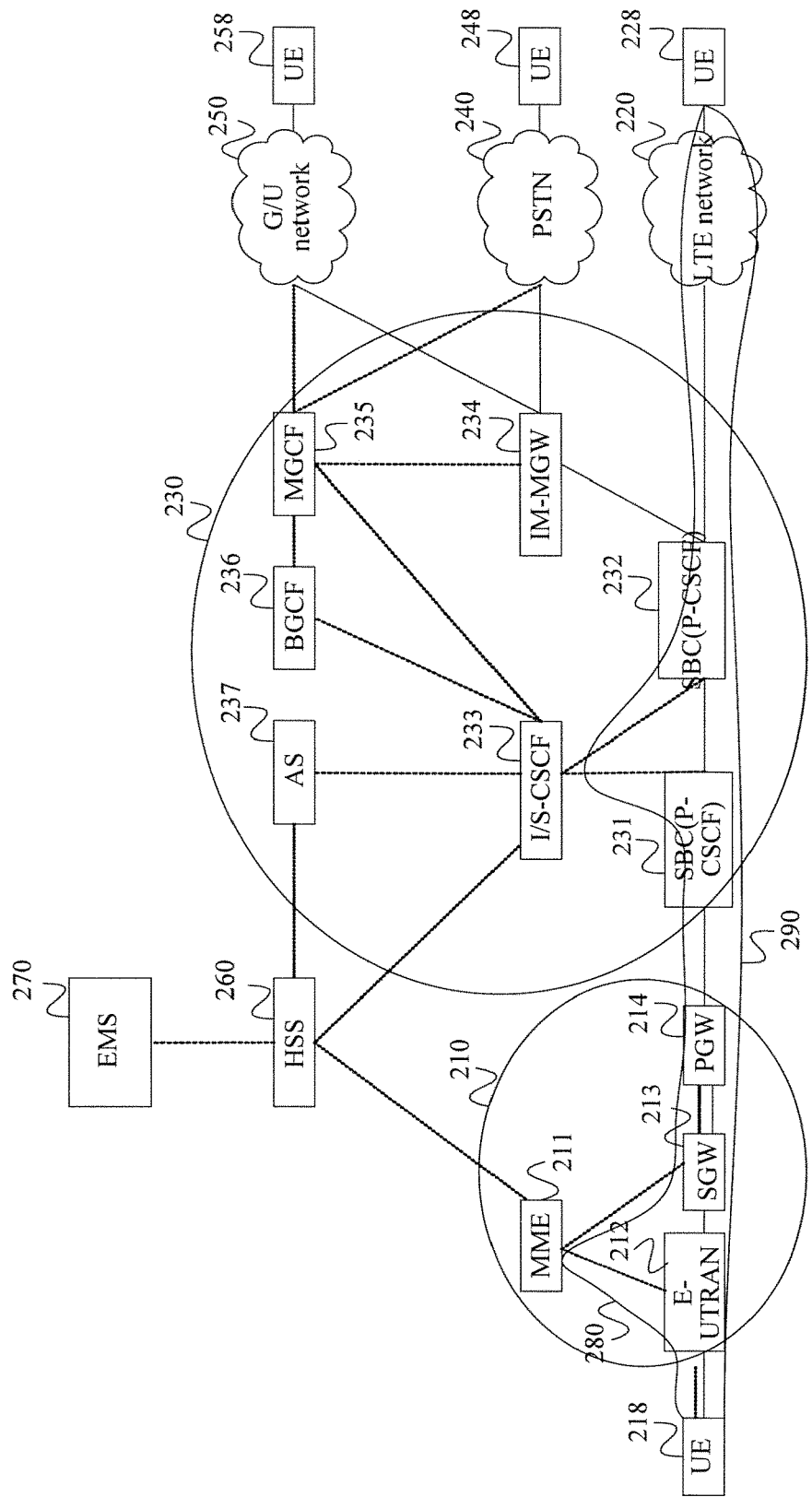
FIG. 2 is a schematic diagram of transmission paths of E2E service signaling and a media plane.

FIG. 2 is a schematic diagram of transmission paths of E2E service signaling and a media plane. As shown in FIG. 2, a system includes multiple networks, namely, an LTE network 210, an LTE network 220, an IMS network 230, a PSTN network 240, and a G/U network 250.

The LTE network 210 specifically includes network elements such as an MME 211, an E-UTRAN 212, an SGW 213, and a PGW 214. The IMS network 230 includes network elements such as a session border controller (proxy call session control) (Session Border Controller (Proxy Call Session Control Function), SBC (P-CSCF)) 231, an SBC (P-CSCF) 232, an interrogating/serving call session control (Interrogating/Serving CSCF, I/S-CSCF) 233, an IP multimedia media gateway (IM-MGW) 234, a media gateway control function (MGCF) 235, a breakout gateway control function (BGCF) 236, and an application server (AS) 237. Specific architectures of the LTE network 220, the PSTN network 240, and the G/U network 250 are not shown.

A UE 218 accesses the LTE network 210, a UE 228 accesses the LTE network 220 and the IMS network 230, a UE 248 accesses the PSTN network 240, and a UE 258 accesses the G/U network 250. An HSS 260 is separately connected to the MME 211 in the LTE network 210, and the I/S-CSCF 233 and the AS 237 in the IMS network; the HSS 260 is also connected to related network elements (not shown in FIG. 2) in the LTE network 220, the PSTN network 240, and the G/U network 250. An EMS 270 is connected to the HSS 260. Other connection relationships between network elements are shown in FIG. 2.

When the UE 218 accessing the LTE network 210 implements a voice communication service with the UE 228 accessing the LTE network 220, a voice signaling transmission path from the UE 218 to the UE 228 sequentially traverses the UE 218, the E-UTRAN 212, the MME 211, the SGW 213, the PGW 214, the SBC (P-CSCF) 231, the I/S-CSCF 233, the SBC (P-CSCF) 232, the LTE network 220, and the UE 228, which is shown by a path 280 in the figure; a voice media transmission path from the UE 218 to the UE 228 sequentially traverses the UE 218, the E-UTRAN 212, the SGW 213, the PGW 214, the SBC (P-CSCF) 231, the SBC (P-CSCF) 232, the LTE network 220, and the UE 228, which is shown by a path 290 in the figure.

It can be seen from FIG. 2 that signaling and a media plane of an LTE voice service all span different fields and devices, and similarly, a data service also spans different fields and devices. Service transmission based on an SAE system may span multiple different fields and devices, and an operation and maintenance manner based on a single network element cannot satisfy needs of operation and maintenance.

Currently, a 3GPP standard defines an E2E Trace network-wide trace function feature. The E2E Trace feature provides a method for tracing and collecting signaling messages of network element interfaces, and an EMS can create a complete E2E view based on the signaling messages reported by network elements. Therefore, E2E visual operation and maintenance for a signaling procedure can be implemented, and E2E Trace can perform operation and maintenance diagnosis of problems in aspects of service access and service maintenance in an E2E manner. However, for a quality of service problem related to end-to-end service transmission of a user, for example, a problem that a packet loss results in voice call interruption or even silence, a technical means, such as capturing a traced user packet inside a network element, or capturing a packet by using an interface probe outside a network element and performing analysis, needs to be used to check and diagnose the network element and the interface one by one. A manner of excluding a network element or an interface one by one is time-consuming and troublesome, and requires a relatively long time for locating, thereby resulting in relatively low detection efficiency.

Figure 3:
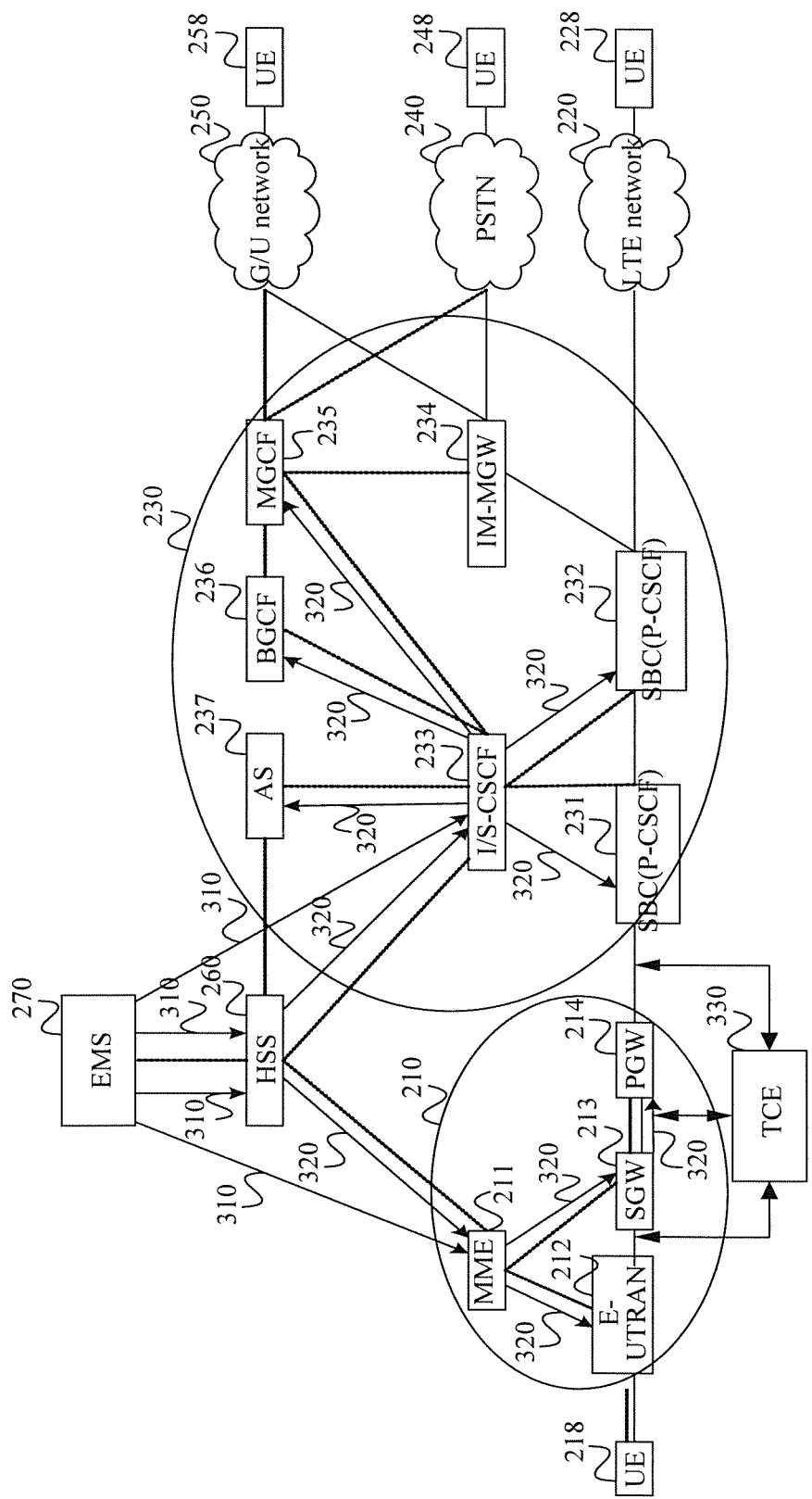
FIG. 3 is a schematic diagram of an architecture of E2E Trace in an LTE network and an IMS network.

FIG. 3 is a schematic diagram of an architecture of E2E Trace in an LTE network and an IMS network, where a network architecture in FIG. 3 is the same as that in FIG. 2. As shown in FIG. 3, in both an LTE network 210 and an IMS network 230, an EMS 270 may be used to configure and deliver a trace parameter to an HSS 260 to activate an E2E Trace procedure, the HSS 260 then transmits the trace parameter to an MME 211 in the LTE network 210, and then the MME 211 transmits the trace parameter to an SGW 213, a PGW 214 or an E-UTRAN 212; or the HSS 260 transmits the trace parameter to an I/S-CSCF 233 in the IMS network 230, and then the I/S-CSCF 233 transmits the trace parameter to an SBC (P-CSCF) 231, an SBC (P-CSCF) 232, an MGCF 235, a BGCF 236 or an AS 237. E2E Trace procedures of the LTE network 210 and the IMS network 230 may also be activated in a way in which the EMS 270 directly delivers a trace parameter to the MME 211 in the LTE network 210 or the I/S-CSCF 233 in the IMS network 230. A path 310 in the figure is an activation path of E2E Trace, and a path 320 is a trace parameter transmission path of the E2E Trace.

After receiving the trace parameter, each network element device creates a trace job, starts trace of a specified interface message of a specified user, and reports a signaling message obtained by the trace to a specified trace collection entity (TCE) 330.

Figure 4:
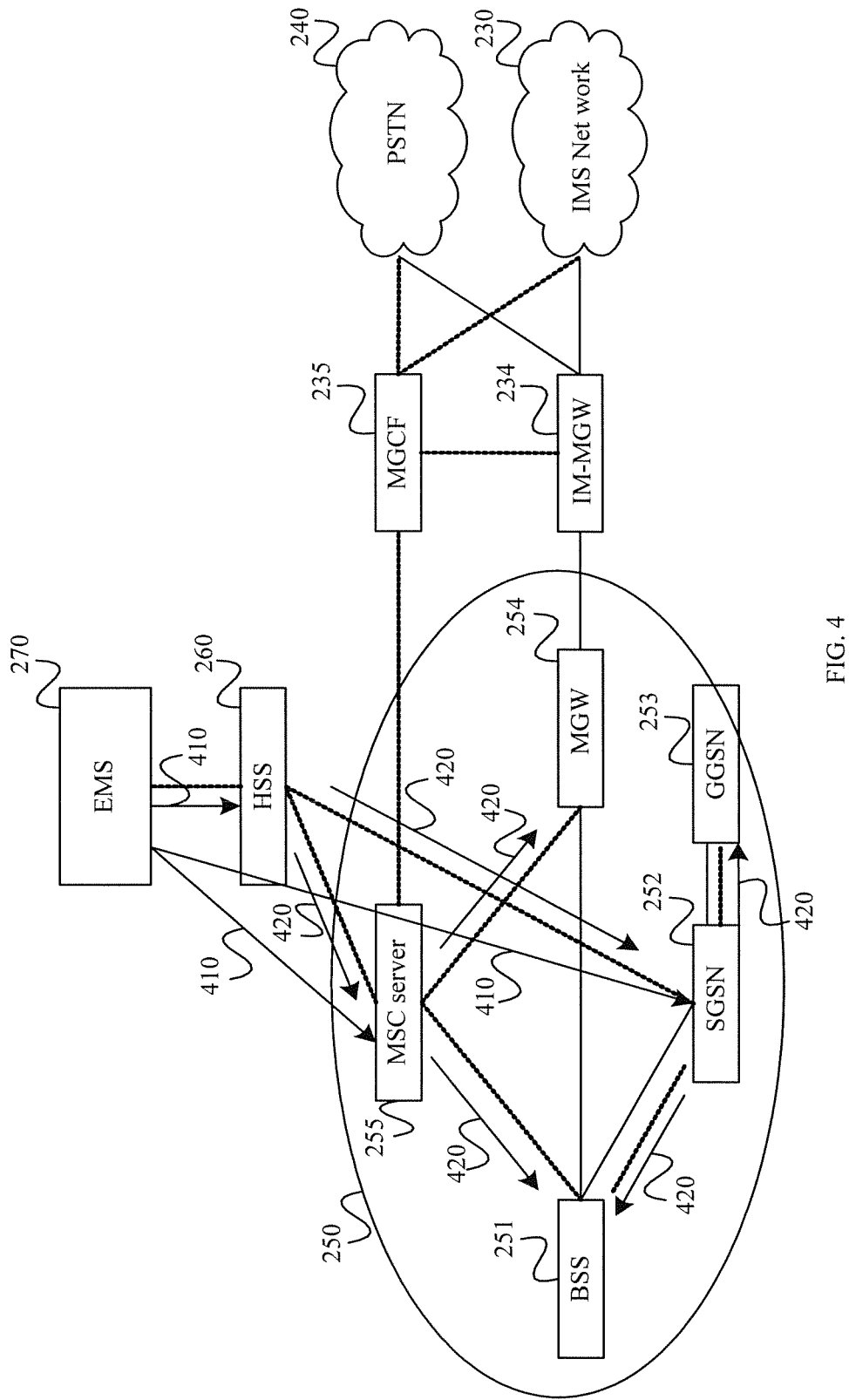
FIG. 4 is a schematic diagram of an architecture of E2E Trace in a G/U network.

FIG. 4 is a schematic diagram of an architecture of E2E Trace in a G/U network. As shown in FIG. 4, a G/U network 250 includes a base station subsystem (Base Station Subsystem, BSS) 251, a serving general packet radio service GPRS) support node (Serving GPRS Support Node, SGSN) 252, a gateway GPRS support node (GGSN) 253, a media gateway (MGW) 254, and a mobile switching center server (MSC Server) 255. Connection relationships between network elements are shown in FIG. 4.

In the G/U network 250, an EMS 270 may be used to configure and deliver a trace parameter to an HSS 260 to activate an E2E Trace procedure, the HSS 260 then transmits the trace parameter to the MSC Server 255 and the SGSN 252 in the G/U network 250, and then the MSC Server 255 and the SGSN 252 transmit the trace parameter to the BSS 251, the GGSN 253 or the MGW 254. An E2E Trace procedure of the G/U network 250 may also be activated in a way in which the EMS 270 directly delivers a trace parameter to the MSC Server 255 and the SGSN 252 in the G/U network 250. A path 410 in the figure is an activation path of E2E Trace, and a path 420 is a trace parameter transmission path of the E2E Trace.

E2E Trace of a circuit switched (CS) domain service of the G/U network 250 is implemented in a way in which the EMS 270 delivers a trace parameter according to a configuration of a home location register (HLR); when a user triggers a service, the HLR delivers an E2E Trace activation message to the MSC Server 255; and the MSC Server 255 delivers the E2E Trace activation message to the BSS 251 or the MGW 254. E2E Trace of a packet switched domain (PS) service of the G/U network 250 is also implemented in a way in which the EMS 270 delivers a trace parameter according to the configuration of the HLR, the HLR delivers an E2E Trace activation message to the SGSN 252, and the SGSN 252 delivers the E2E Trace activation message to the BSS 251 or the GGSN 253. E2E Trace in the G/U network 250 may also be triggered in a way in which the EMS 270 directly delivers a trace parameter to the MSC Server 255 in a CS network or the SGSN 252 in a PS network. In the process of implementing a service, each network element reports a trace message to a specified TCE.

The TCE identifies a trace file of a same session of a same user for the trace message reported by each network element, parses the trace file, and presents the trace file to the user, so as to facilitate problem locating.

Only a signaling procedure can be traced in the existing E2E Trace procedures shown in FIG. 3 and FIG. 4, which may be used for operation and maintenance diagnosis of problems in aspects of service access and service maintenance, but do not cover detection of a quality of service problem related to end-to-end service transmission of a user.

Figure 5:
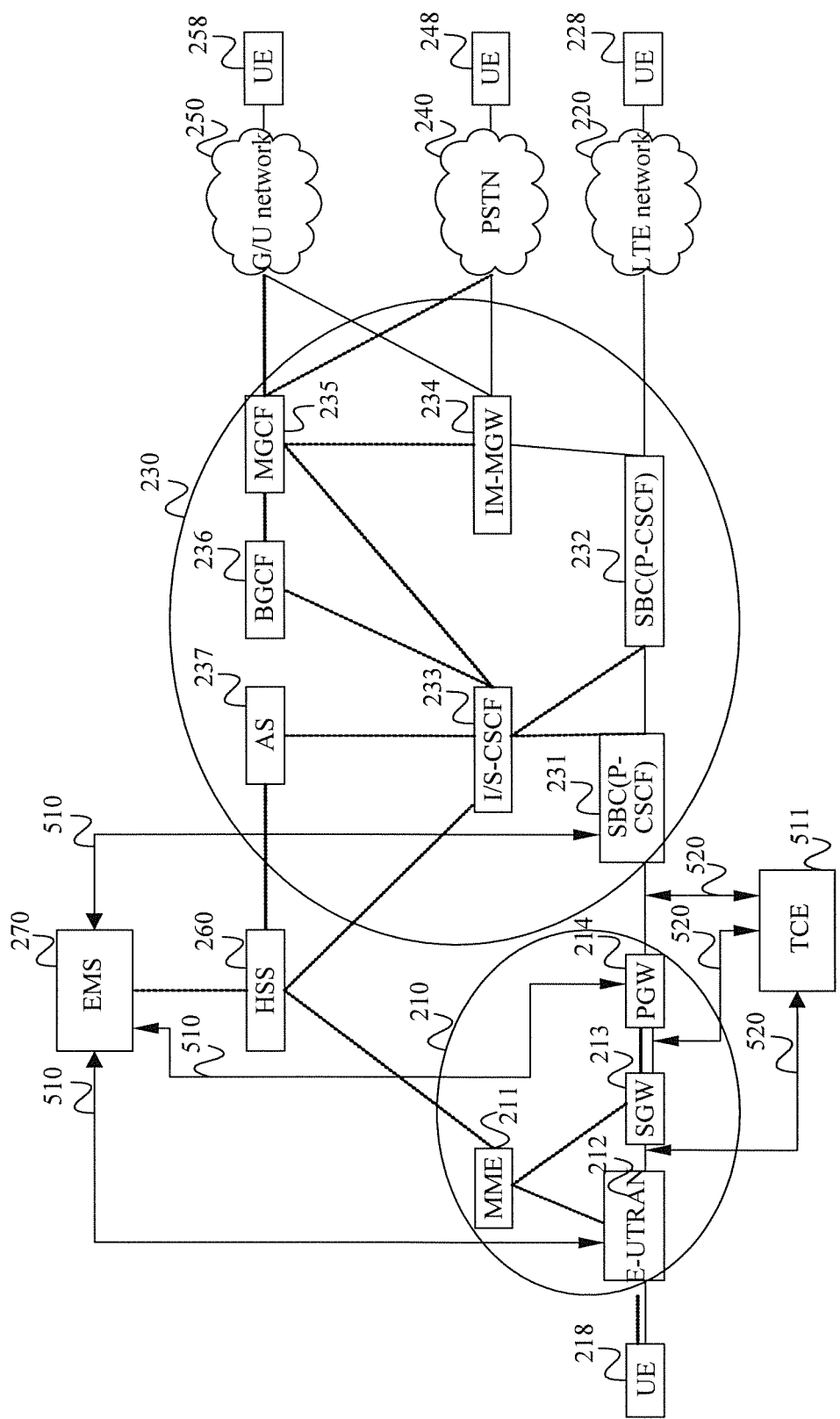
FIG. 5 is a schematic diagram of capturing of a traced user packet inside a network element, and capturing of a packet by using an interface probe outside a network element.

To perform detection on a quality of service problem related to end-to-end service transmission of a user, a method of capturing a traced user packet inside a network element, or capturing a packet by using an interface probe outside a network element and performing analysis may be used in the prior art. FIG. 5 is a schematic diagram of capturing of a traced user packet inside a network element, and capturing of a packet by using an interface probe outside a network element. FIG. 5 uses a network architecture that is the same as that in FIG. 2, and a part that is the same as that in FIG. 2 is not described again.

It can be known according to the foregoing description of FIG. 2 that media plane data of a service passes through only some network element devices in a network; therefore, detection of a quality of service problem of end-to-end service transmission of a user may be performed only for a network element transmitting and processing the media plane data of the service. As shown in FIG. 5, an EMS 270 may sequentially perform, according to a path 510, capturing of a traced user packet and analysis for a media plane network element device affecting quality of service of end-to-end service transmission of a user, such as an E-UTRAN 212, a PGW 214 or an SBC (P-CSCF) 231, check network elements one by one in terms of a parameter affecting the quality of service of the end-to-end service transmission of the user, such as packet loss, latency or jitter that is caused by IP transmission, and determine a network element device causing a problem. This is the method of capturing a traced user packet inside a network element.

Similarly, for an interface probe device outside a network element, a trace collection entity TCE 511 performs, according to a path 520, packet capturing and analysis at an external interface of each network element (the E-UTRAN 212, an SGW 213, the PGW 214 or an SBC (P-CSCF) 232), checks interfaces one by one in terms of the parameter affecting the quality of service of the end-to-end service transmission of the user, such as packet loss, latency or jitter that is caused by IP transmission, and determines a network element device causing a problem. This is the method of capturing a packet by using an interface probe outside a network element.

Although a technical means such as capturing a traced user packet inside a network element, or capturing a packet by using an interface probe outside a network element and performing analysis may cover detection of a quality of service problem of end-to-end service transmission of a user, a manner of excluding network elements or interfaces one by one is time-consuming and troublesome, and requires a relatively long time for locating, thereby resulting in relatively low detection efficiency.

Figure 6:
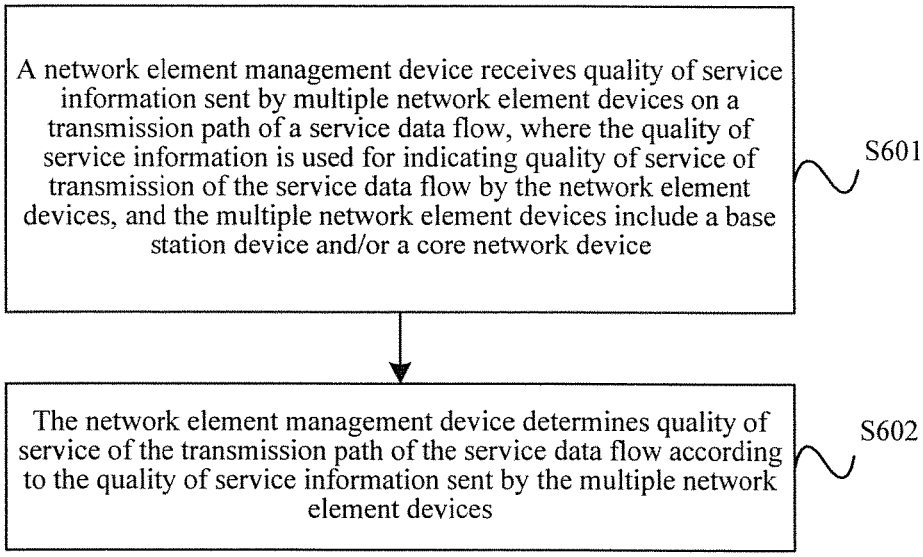
FIG. 6 is a flowchart of Embodiment 1 of a mobile communications network detection method according to an embodiment of the present invention.

FIG. 6 is a flowchart of Embodiment 1 of a mobile communications network detection method according to an embodiment of the present invention. As shown in FIG. 6, the method in this embodiment includes:

Step S601: A network element management device receives quality of service information sent by multiple network element devices on a transmission path of a service data flow, where the quality of service information is used for indicating quality of service of transmission of the service data flow by the network element devices, and the multiple network element devices include a base station device and a core network device.

Specifically, because existing detection of a quality of service problem of end-to-end service transmission of a user relies on trace, packet capturing, and analysis of one network element or interface after another, a locating time is relatively long, and detection efficiency is low. Each service data flow transmitted in a network passes through multiple network element devices, and when a fault occurs in a network element device through which the service data flow passes, quality of service of the service data flow is affected. For the foregoing characteristics, the network element management device in this embodiment receives, for each service data flow, quality of service information sent by multiple network element devices on a transmission path of the service data flow, where the quality of service information is sent by each network element device to the network element management device after the network element device detects quality of service of transmission of the service data flow by the network element device. The quality of service information sent by the network element device to the network element management device may be sent when the network element device detects that the quality of service of the transmission of the service data flow is lower than a preset threshold, or the network element device may periodically send the quality of service of the transmission of the service data flow to the network element management device. The network element device sending the quality of service information to the network element management device may be a base station device such as an E-UTRAN or a BSS in a network, or the network element device may be a core network device such as an SGW, a PGW or an SBC (P-CSCF) in a network. The network element management device in this embodiment is a centralized management device, for example, a device such as an EMS or a TCE, which is deployed in a network and can receive information sent by each network element device in the network. It should be noted that in an actual deployment, according to different operation requirements, the TCE may be integrated to another network element device, or may be an independent network element device.

Step S602: The network element management device determines quality of service of the transmission path of the service data flow according to the quality of service information sent by the multiple network element devices.

Specifically, after the network element management device receives the quality of service information sent by the multiple network element devices, the network element management device can learn the quality of service of the transmission path of the service data flow, and the network element management device can obtain quality of service of a service after analyzing the received quality of service, and can quickly determine a network element affecting the quality of service of the service.

In this embodiment, the quality of service information sent by the network element devices may be referred to as Internet Protocol quality of service (IPQoS), and the IPQoS includes a parameter that can indicate quality of service of end-to-end transmission of a service transmitted by a network element device, such as packet loss, latency, jitter and/or a mean opinion score (MOS).

In this embodiment, an element management system is used to receive quality of service information that is sent by multiple network element devices on a transmission path of a service data flow and is of transmission of the service data flow, so that the element management system can quickly detect quality of service of the transmission of the service data flow by comparing the quality of service information of the transmission of the service data flow by the network element devices, thereby facilitating quick locating of a problem, improving operation and maintenance efficiency in terms of service experience, and reducing operation and maintenance cost.

In the mobile communications network detection method provided in this embodiment of the present invention, the quality of service information received by the network element management device may be based on two attributes, that is, based on a bearer attribute of the service data flow and based on a service attribute of the service data flow. In addition, a service data flow in a network is also classified into an uplink data flow and a downlink data flow. The mobile communications network detection method provided in this embodiment of the present invention is described below separately by using combinations of the two attributes of the service data flow and the uplink data flow and the downlink data flow.

When the service data flow is an uplink data flow, the quality of service information sent by the base station device is quality of service information of a received Packet Data Convergence Protocol (PDCP) data packet carrying the service data flow, and the quality of service information sent by the core network device is quality of service information of a received General packet radio service tunneling protocol (GTP) data packet carrying the service data flow.

When the service data flow is a downlink data flow, the quality of service information sent by the base station device is quality of service information of a received GTP data packet carrying the service data flow and quality of service information of a sent PDCP data packet carrying the service data flow.

When the service data flow is an uplink data flow, the quality of service information sent by the base station device and the core network device is quality of service information of a received data packet that is of a service protocol and carries the service data flow, where the service protocol is based on the service attribute of the service data flow.

When the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on the service attribute of the service data flow.

Figure 7:
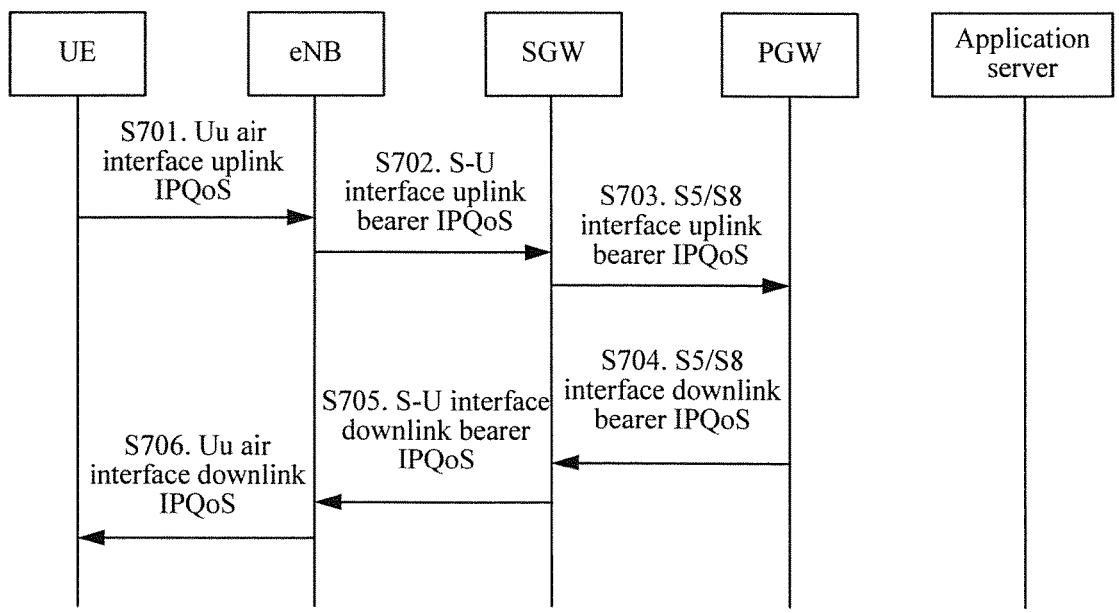
FIG. 7 is a signaling flowchart of detecting quality of service information of a network based on a bearer attribute of a service data flow.
Figure 8:
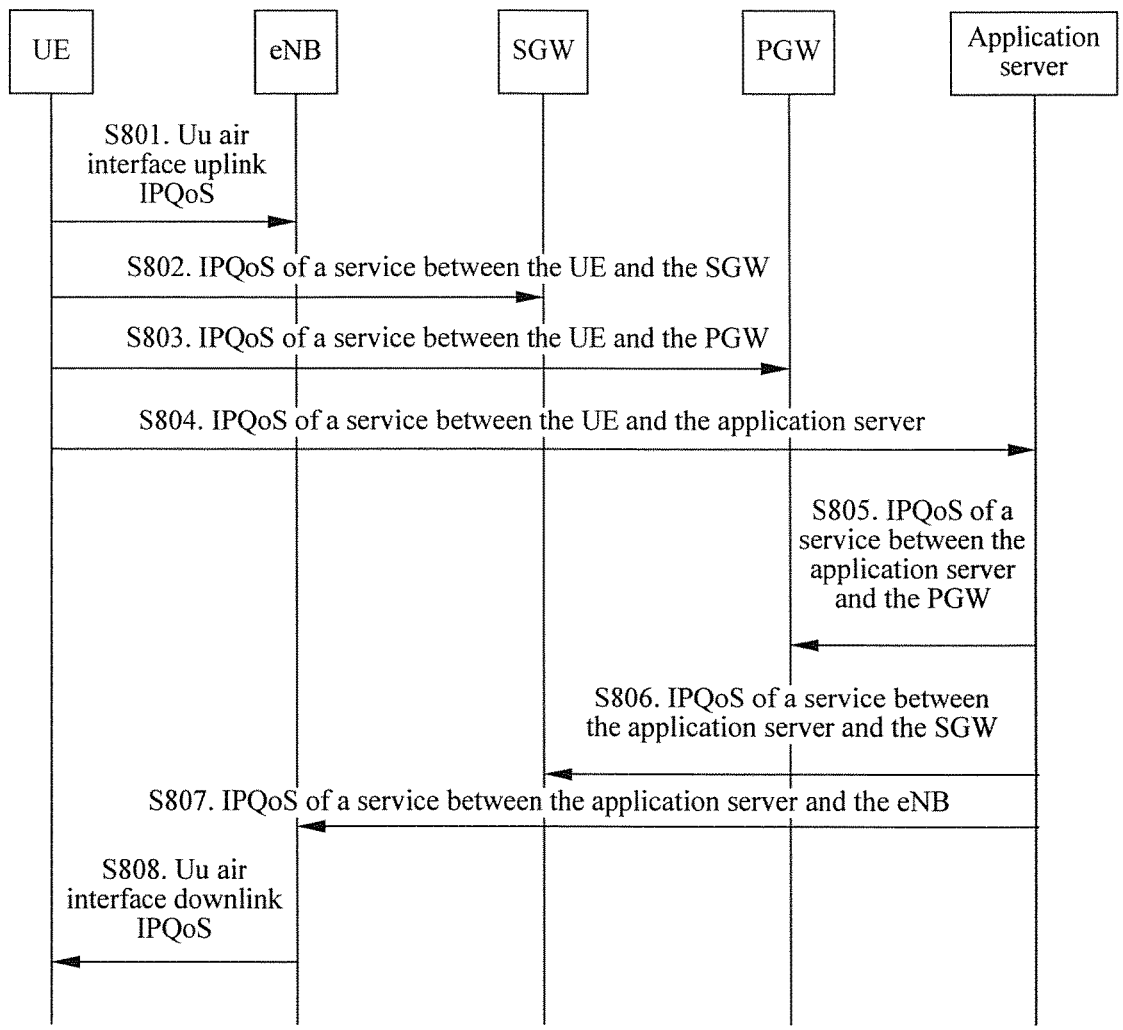
FIG. 8 is a signaling flowchart of detecting quality of service information of a network based on a service application attribute.

FIG. 7 is a signaling flowchart of detecting quality of service information of a network based on a bearer attribute of a service data flow, and FIG. 8 is a signaling flowchart of detecting quality of service information of a network based on a service application attribute. FIG. 7 and FIG. 8 describe only an LTE network, but a quality of service information detection method of another network is similar to that of the LTE network, and is not described again herein.

As shown in FIG. 7, for an LTE network, a service media plane packet is transmitted on an air interface Packet Data Convergence Protocol (PDCP) bearer established between a UE and an evolved NodeB (eNB) (namely an E-UTRAN), and a general packet radio service tunneling protocol (GTP)

bearer established between network element devices, namely, an eNB, an SGW, and a PGW.

Packets transmitted on the PDCP bearer and the GTP bearer have corresponding sequence numbers; therefore, IPQoS collection may be performed based on the sequence numbers (Sequence Number, SN) of the packets on the PDCP bearer or the GTP bearer, a local receiving time of a network element device, and the like. For example, a packet transmitted each time on the PDCP bearer or the GTP bearer has a sequence number, and sequence numbers of packets transmitted consecutively are consecutive; if packet loss occurs in a packet transmission process, sequence numbers of packets are not consecutive. IPQoS may be determined according to a frequency of non-consecutive sequence numbers of packets and an interval of the non-consecutive sequence numbers.

Because both the PDCP bearer and the GTP bearer are established between network element devices on a service media transmission path, IPQoS traced and collected by a network element device based on a service bearer reflects service influence between two endpoints, namely, network element devices.

In FIG. 7, in step S701, IPQoS of an uplink bearer on which data is sent by a UE to an eNB through a Uu air interface is collected by the eNB; in step S702, IPQoS of an uplink bearer on which data is sent by the eNB to an SGW through an S-U interface is collected by the SGW; in step S703, IPQoS of an uplink bearer on which data is sent by the SGW to a PGW through an S5/S8 interface is collected by the PGW. In step S704, IPQoS of a downlink bearer on which data is sent by the PGW to the SGW through the S5/S8 interface is collected by the SGW; in step S705, IPQoS of a downlink bearer on which data is sent by the SGW to the eNB through the S-U interface is collected by the eNB; in step S706, IPQoS of a downlink bearer on which data is sent by the eNB to the UE through the Uu interface is collected by the eNB. A network element device collecting IPQoS may send the IPQoS to a network element management device according to an instruction. The network element management device may determine, according to the collected IPQoS, whether a problem affecting quality of service of end-to-end service transmission exists in a bearer between two network elements, thereby determining a specific network element and interface that have the problem. An uplink data flow is detected in step S701, step S702, and step S703 in the figure, and a downlink data flow is detected in step S704, step S705, and step S706. It can be known from the foregoing collection process that a network element device collecting quality of service is usually a receiving party of a data packet, and when the receiving party of the data packet is a user equipment, a network side device, such as a base station, may collect quality of service. A person skilled in the art should know that for different collection needs, a sending party of a data packet may also collect quality of service of a data packet transmitted by the sending party.

When a detected service data flow is an uplink data flow, IPQoS collected by the eNB is quality of service information of a received PDCP data packet carrying the service data flow, and IPQoS collected by a core network device such as the SGW and the PGW is quality of service information of a received GTP data packet carrying the service data flow.

When a detected service data flow is a downlink data flow, IPQoS collected by the eNB is quality of service information of a received GTP data packet carrying the service data flow and quality of service information of a sent PDCP data packet carrying the service data flow, and IPQoS collected by a core network device such as the SGW is the quality of service information of the received GTP data packet carrying the service data flow.

FIG. 7 shows only an IPQoS collection method for a PDCP bearer and a GTP bearer, but the mobile communications network detection method provided in this embodiment of the present invention is not limited to the PDCP bearer and the GTP bearer, and IPQoS collection similar to that in FIG. 7 may also be performed for a network bearer protocol based on another manner.

As shown in FIG. 8, a difference between FIG. 8 and FIG. 7 is mainly that quality of service of a network is detected based on a service bearer attribute in FIG. 7, but detection is performed based on a service attribute of a service data flow in FIG. 8. Usually, detection of quality of service based on a service attribute of a service data flow may be implemented by detecting a data packet at a service layer of the service data flow. In FIG. 8, quality of service of a network is detected based on an application layer of a service data flow, that is, IPQoS collection is performed based on an application layer between a UE and an application server (APP Server).

For example, for a voice service, the Real-Time Transport Protocol is established between a UE and an IMS server; therefore, a service attribute of the voice service may include an RTP application attribute. The RTP application attribute includes a sequence number SN of a voice packet, and sampling periods corresponding to different voice encoding and decoding; therefore, IPQoS collection may be performed based on the RTP application attribute of the voice packet. For example, the RTP application attribute includes a sequence number of a voice packet, and sequence numbers of voice packets transmitted consecutively are consecutive; if packet loss occurs in a voice packet transmission process, sequence numbers of voice packets are not consecutive. IPQoS may be determined according to a frequency of non-consecutive sequence numbers of voice packets and an interval of the non-consecutive sequence numbers.

An LTE network element device is located at a middle transmission position between a UE and an APP server; therefore, IPQoS traced and collected by the network element device based on a service attribute reflects service influence between the UE and the network element device or between the APP server and the network element device.

In FIG. 8, when service transmission is performed between the UE and the APP Server, forwarding by network elements such as an eNB, an SGW, and a PGW is needed. For an uplink service, in step S801, the eNB collects IPQoS of uplink data sent by the UE to the eNB through a Uu air interface; in step S802, the SGW collects IPQoS of a service transmitted between the UE and the SGW; in S803, the PGW collects IPQoS of a service transmitted between the UE and the PGW; in step S804, the APP Server collects IPQoS of a service transmitted between the UE and the APP Server. For a downlink service, in step S805, the PGW collects IPQoS of a service transmitted between the APP Server and the PGW; in step S806, the SGW collects IPQoS of a service transmitted between the APP Server and the SGW; in step S807, the eNB collects IPQoS of a service transmitted between the APP Server and the eNB; in step S808, the APP Server collects IPQoS of a service transmitted between the APP Server and the UE. It can be known from the foregoing collection process that a network element device collecting quality of service is usually a receiving party of a data packet, and when the receiving party of the data packet is a user equipment, a network side device, such as a base station, may collect quality of service. A person skilled in the art should know that for different collection needs, a sending party of a data packet may also collect quality of service of a data packet transmitted by the sending party.

A network element device collecting IPQoS may send the IPQoS to a network element management device according to an instruction. The network element management device may determine, according to the collected IPQoS, whether a problem affecting quality of service of end-to-end service transmission of a service exists in a network; and determine, according to network elements reporting the IPQoS, a network element and an interface in which the problem exists. In the figure, an uplink data flow is detected in step S801, step S802, step S803, and step S804, and a downlink data flow is detected in step S805, step S806, step S807, and step S808.

When a detected service data flow is an uplink data flow, the IPQoS collected by the eNB and a core network device (for example, the SGW, the PGW or the APP Server) is quality of service information of a received data packet that is of a service protocol and carries the service data flow, where the service protocol is based on a service attribute of the service data flow.

When a detected service data flow is an uplink data flow, the IPQoS collected by the eNB is quality of service information of received and sent data packets that are of the service protocol and carry the service data flow, and the IPQoS collected by the core network device (for example, the SGW, the PGW or the APP Server) is quality of service of the received data packet that is of the service protocol and carries the service data flow, where the service protocol is based on a service attribute of the service data flow.

Further, in the embodiment shown in FIG. 6, that the network element management device determines quality of service of the transmission path of the service data flow according to the quality of service information sent by the multiple network element devices includes: the network element management device determines, according to the quality of service information sent by the multiple network element devices, a network element device having the lowest quality of service on the transmission path of the service data flow.

Specifically, a network element device having the greatest influence on quality of service of end-to-end service transmission is the network element device having the lowest quality of service on the transmission path of the service data flow; therefore, after receiving the quality of service information sent by the multiple network element devices on the transmission path of the service data flow, the network element management device can find a network element device having the greatest influence on the service data flow by determining the network element device having the lowest quality of service on the transmission path of the service data flow. Repair of the network element device can improve transmission quality of the transmission path of the service data flow to the greatest extent, and therefore a problem affecting quality of service of end-to-end transmission of the service data flow in a network can be detected and resolved as soon as possible.

Further, after the receiving, by network element management device, the quality of service information sent by the multiple network element devices, the mobile communications network detection method provided in this embodiment of the present invention further includes: generating, by the network element management device, a statistical diagram according to the quality of service information sent by the multiple network element devices, where the statistical diagram is used for indicating a change situation of the quality of service of the transmission path.

Specifically, after receiving the quality of service information sent by the multiple network element devices on the transmission path of the service data flow, the network element management device may further generate a statistical diagram according to multiple pieces of quality of service information, where the statistical diagram is used for indicating quality of service of each network element on the whole transmission path of the service data flow. Such a statistical diagram is created for each service data flow, and then quality of service of each service data flow can be seen intuitively, so that it is convenient for network operation and maintenance personnel to maintain each network element device in a network accordingly.

Further, each network element device in a network may periodically send quality of service information to the network element management device according to a preset mechanism of the network element device, or a network element device may transmit quality of service information of a service data flow to the network element management device after the network element management device sends detection indication information to multiple network element devices in the network.

A specific method of sending the detection indication information to the multiple network element devices in the network by the network element management device may be that: With reference to the E2E Trace procedures of each network shown in FIG. 3 and FIG. 4, the network element management device further sends the detection indication information to each network element device while sending a trace parameter to each network element. The network element management device may send end-to-end trace session activation signaling to a network control network element (for example, an I/S-CSCF in an IMS network or an MSC Server in a G/U network), where the end-to-end trace session activation signaling includes the detection indication information, so that the network control network element sends the detection indication information to the multiple network element devices; or the network element management device may further send end-to-end trace session activation signaling to a home subscriber server, so that after the home subscriber server sends the detection indication information to a network control network element, the network control network element sends the detection indication information to the multiple network element devices.

In addition, the end-to-end trace session activation signaling sent by the network element management device further includes information about a network element device to be detected, so that the network control network element sends the detection indication information to the network element device to be detected. That is, the network element management device may specify a network element device needing to report quality of service information, so that the network control network element sends the detection indication information only to the specified network element device needing to report quality of service information.

Further, the end-to-end trace session activation signaling further includes a job type information element, and the job type information element is used for instructing the multiple network element devices to send a trace signaling message and/or the detection indication information to the network element management device. That is, the network element management device may instruct a network element device to perform an existing E2E Trace procedure and/or the mobile communications network detection method provided in this embodiment of the present invention.

Specifically, in this embodiment of the present invention, triggering of a network element device to collect and report quality of service information by the network element management device is implemented by extending the existing E2E Trace procedure. To ensure that the existing E2E Trace procedure can still be performed normally and that a signaling collection and reporting mechanism in existing E2E Trace is not affected, a Job Type information element may be added in E2E Trace activation signaling, where the Job Type information element is used for indicating a job type of E2E Trace. The Job Type information element may be classified into three types, which are separately trace signaling only, trace IPQoS only, and trace signaling and IPQoS, whose corresponding E2E Trace procedures are respectively collecting and reporting only signaling that is the same as that in the prior art, collecting and reporting only quality of service information that is described in the foregoing embodiment, and collecting and reporting both signaling and quality of service information. In this way, quality of service information may be selectively collected and reported without affecting the existing E2E Trace procedure, and a more flexible network detection method is provided.

Further, in the foregoing embodiments, the core network device includes a serving gateway and a data gateway.

Transmission of IPQoS detection indication information involves two procedures, one is a transmission procedure for a user in a process of attach/tracking area update/handover, and the other is a transmission procedure for a user after the attach/tracking area update/handover.

Figure 9:
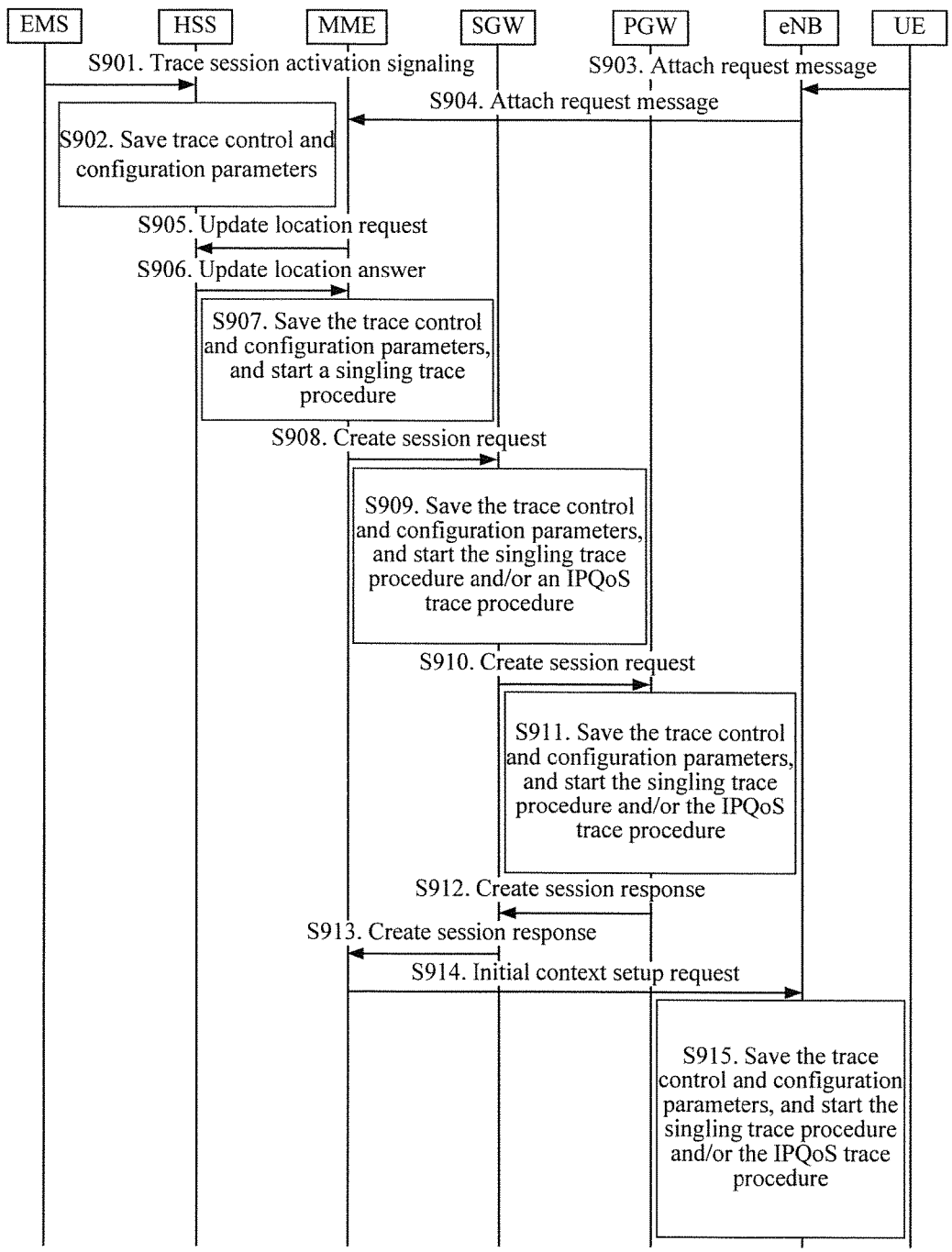
FIG. 9 is a flowchart of signaling transmission of IPQoS detection indication information in a scenario in which a user is accessing an MME in an LTE network.
Figure 10:
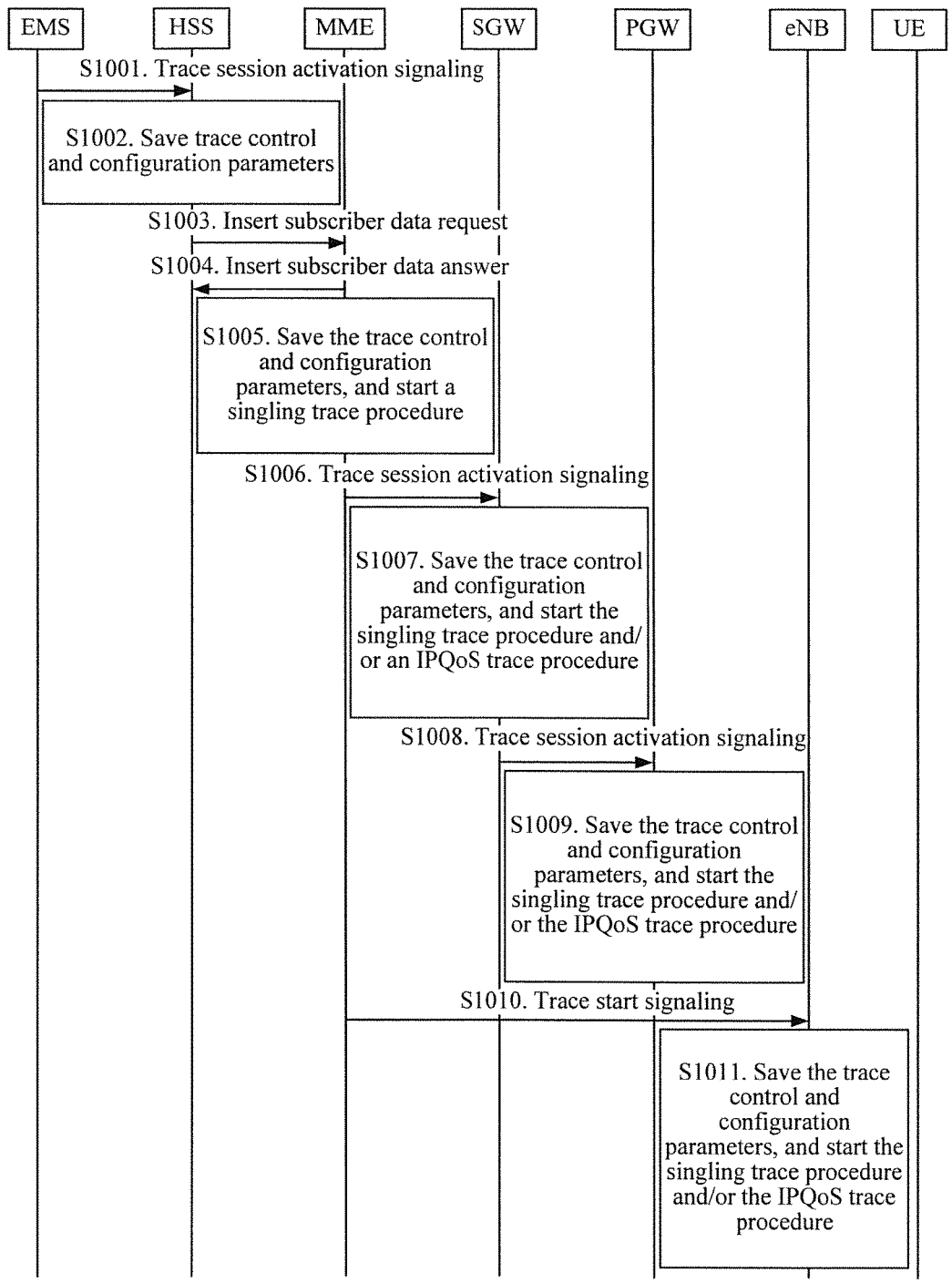
FIG. 10 is a flowchart of signaling transmission of IPQoS detection indication information in a scenario in which a user has accessed an MME in an LTE network.

A transmission procedure of IPQoS detection indication information is described in FIG. 9 and FIG. 10 by using an LTE network as an example, and only a scenario in which a UE accesses an MME by using an attach procedure is used as an example for description in FIG. 9 and FIG. 10.

FIG. 9 is a flowchart of signaling transmission of IPQoS detection indication information in a scenario in which a user is accessing an MME in an LTE network. An EMS delivers IPQoS detection indication signaling by using trace session activation signaling, and network elements receiving the IPQoS detection indication signaling transmit the IPQoS detection indication signaling between each other by creating a job request or using an existing message between the network elements. As shown in FIG. 9, in step S901, an EMS sends trace session activation signaling to an HSS, where the trace session activation signaling includes a trace job type information element; in step S902, the HSS saves trace control and configuration parameters in the trace session activation signaling; in step S903, a UE sends an attach request message to an eNB; after receiving the attach request message sent by the UE, the eNB forwards the attach request message to an MME in step S904; after receiving the attach request message sent by the UE, the MME sends an update location request to the HSS in step S905; after receiving the update location request, the HSS sends an update location answer to the MME in step S906, where the update location answer carries a trace job type information element; in step S907, the MME saves the trace control and configuration parameters, and starts a signaling trace procedure according to an instruction of a job type information element in the trace control and configuration parameters; in step S908, the MME sends a create session request to an SGW, where the create session request carries the trace job type information element; in step 909, the SGW saves the trace control and configuration parameters, and starts the signaling trace procedure and/or an IPQoS trace procedure according to the instruction of the job type information element in the trace control and configuration parameters; in step S910, the SGW sends the create session request to a PGW, where the create session request carries the trace job type information element; in step S911, the PGW saves the trace control and configuration parameters, and starts the signaling trace procedure and/or the IPQoS trace procedure according to the instruction of the job type information element in the trace control and configuration parameters; in step S912, the PGW sends a create session response to the SGW; in step S913, the SGW sends the create session response to the MME; in step S914, the MME sends an initial context setup request to the eNB, where the initial context setup request carries the trace job type information element; in step S915, the eNB saves the trace control and configuration parameters, and starts the signaling trace procedure and/or the IPQoS trace procedure according to the instruction of the job type information element in the trace control and configuration parameters.

It should be noted that in FIG. 9, the MME may further directly receive trace control and configuration parameters sent from the EMS, without a need of forwarding by the HSS. In a tracing area update/handover (TAU/Handover) procedure, the MME may further receive trace control and configuration parameters transmitted from a peer MME. Step S908 and step S914 may be performed simultaneously. In conclusion, the MME transmits a trace parameter to the SGW/PGW by using an Attach/TAU/Handover procedure message, and transmits the trace parameter to the eNB by using an Attach/Service Request/Handover procedure message.

FIG. 10 is a flowchart of signaling transmission of IPQoS detection indication information in a scenario in which a user has accessed an MME in an LTE network. As shown in FIG. 10, in step S1001, an EMS sends trace session activation signaling to an HSS, where the trace session activation signaling includes a trace job type information element; in step S1002, the HSS saves trace control and configuration parameters; in step S1003, the HSS sends an insert subscriber data request to the MME, where the insert subscriber data request carries the trace job type information element; in step S1004, the MME returns an insert subscriber data answer to the HSS; in step S1005, the MME saves the trace control and configuration parameters, and starts a signaling trace procedure according to an instruction of a job type information element in the trace control and configuration parameters; in step S1006, the MME sends the trace session activation signaling to an SGW, where the trace session activation signaling carries the trace job type information element; in step S1007, the SGW saves the trace control and configuration parameters, and starts the signaling trace procedure and/or an IPQoS trace procedure according to the instruction of the job type information element in the trace control and configuration parameters; in step S1008, the SGW sends the trace session activation signaling to a PGW, where the trace session activation signaling carries the trace job type information element; in step S1009, the PGW saves the trace control and configuration parameters, and starts the signaling trace procedure and/or the IPQoS trace procedure according to the instruction of the job type information element in the trace control and configuration parameters; in step S1010, the MME sends trace start signaling to an eNB, where the trace start signaling carries the trace job type information element; in step S1011, the eNB saves the trace control and configuration parameters, and starts the signaling trace procedure and/or the IPQoS trace procedure according to the instruction of the job type information element in the trace control and configuration parameters.

It should be noted that in FIG. 10, the MME may further directly receive trace control and configuration parameters sent from the EMS, without a need of forwarding by the HSS. Step S1006 and step S1010 may be performed simultaneously. In conclusion, the MME transmits a trace parameter to the SGW/PGW by using a trace session activation signaling message, and transmits the trace parameter to the eNB by using trace start signaling.

Figure 11:
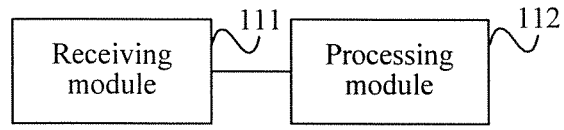
FIG. 11 is a schematic structural diagram of Embodiment 1 of a mobile communications network detection apparatus according to an embodiment of the present invention.

FIG. 11 is a schematic structural diagram of Embodiment 1 of a mobile communications network detection apparatus according to an embodiment of the present invention. As shown in FIG. 11, the mobile communications network detection apparatus in this embodiment includes:

a receiving module 111, configured to receive quality of service information sent by multiple network element devices on a transmission path of a service data flow, where the quality of service information is used for indicating quality of service of transmission of the service data flow by the network element devices, and the multiple network element devices include a base station device and a core network device; and a processing module 112, configured to determine quality of service of the transmission path of the service data flow according to the quality of service information sent by the multiple network element devices.

The mobile communications network detection apparatus in this embodiment is configured to execute the technical solution in the method embodiment shown in FIG. 6, and has the same implementation principle and technical effect as the method embodiment, and details are not described again herein.

Further, in the embodiment shown in FIG. 11, when the service data flow is an uplink data flow, the quality of service information sent by the base station device is quality of service information of a received PDCP data packet carrying the service data flow.

Further, in the embodiment shown in FIG. 11, when the service data flow is a downlink data flow, the quality of service information sent by the base station device is quality of service information of a received GTP data packet carrying the service data flow and quality of service information of a sent PDCP data packet carrying the service data flow.

Further, in the embodiment shown in FIG. 11, the quality of service information sent by the core network device is the quality of service information of the received GTP data packet carrying the service data flow.

Further, in the embodiment shown in FIG. 11, when the service data flow is an uplink data flow, the quality of service information sent by the base station device and the core network device is quality of service information of a received data packet that is of a service protocol and carries the service data flow, where the service protocol is based on a service attribute of the service data flow.

Further, in the embodiment shown in FIG. 11, when the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on a service attribute of the service data flow.

Further, in the embodiment shown in FIG. 11, the service protocol includes the RTP.

Further, in the embodiment shown in FIG. 11, the processing module 112 is specifically configured to determine, according to the quality of service information sent by the multiple network element devices, a network element device having the lowest quality of service on the transmission path of the service data flow.

Figure 12:
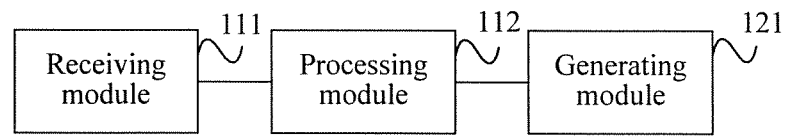
FIG. 12 is a schematic structural diagram of Embodiment 2 of a mobile communications network detection apparatus according to an embodiment of the present invention.

FIG. 12 is a schematic structural diagram of Embodiment 2 of a mobile communications network detection apparatus according to an embodiment of the present invention. As shown in FIG. 12, based on FIG. 11, the mobile communications network detection apparatus in this embodiment further includes:

a generating module 121, configured to generate a statistical diagram according to the quality of service information sent by the multiple network element devices, where the statistical diagram is used for indicating a change situation of the quality of service of the transmission path.

Figure 13:
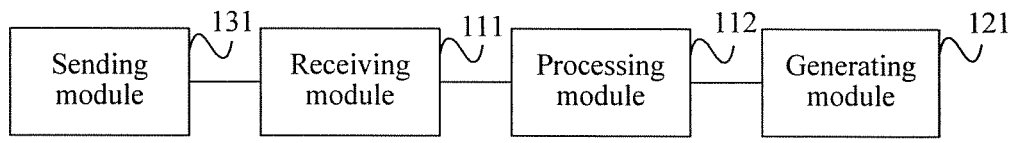
FIG. 13 is a schematic structural diagram of Embodiment 3 of a mobile communications network detection apparatus according to an embodiment of the present invention.

FIG. 13 is a schematic structural diagram of Embodiment 3 of a mobile communications network detection apparatus according to an embodiment of the present invention. As shown in FIG. 13, based on FIG. 12, the mobile communications network detection apparatus in this embodiment further includes:

a sending module 131, configured to send detection indication information to the multiple network element devices, where the detection indication information is used for indicating detection of the quality of service of the transmission of the service data flow by the network element devices.

Further, in the embodiment shown in FIG. 13, the sending module 131 is specifically configured to send end-to-end trace session activation signaling to a network control network element, where the end-to-end trace session activation signaling includes the detection indication information, so that the network control network element sends the detection indication information to the multiple network element devices; or send end-to-end trace session activation signaling to a home subscriber server, so that after the home subscriber server sends the detection indication information to a network control network element, the network control network element sends the detection indication information to the multiple network element devices.

Further, in the embodiment shown in FIG. 13, the end-to-end trace session activation signaling further includes information about a network element device to be detected, so that the network control network element sends the detection indication information to the network element device to be detected.

Further, in the embodiment shown in FIG. 13, the end-to-end trace session activation signaling further includes a job type information element, and the job type information element is used for instructing the multiple network element devices to send a trace signaling message and/or the detection indication information to the network element management device.

Further, in the embodiments shown in FIG. 11 to FIG. 13, the core network device includes a serving gateway and a data gateway.

Further, in the embodiments shown in FIG. 11 to FIG. 13, the quality of service information includes a packet loss rate, jitter, latency or a MOS value of a data packet.

Figure 14:
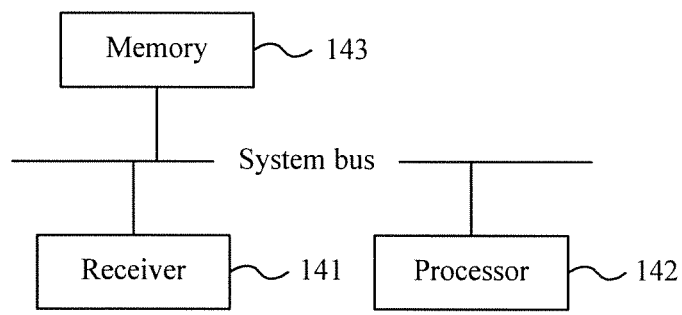
FIG. 14 is a schematic structural diagram of Embodiment 4 of a mobile communications network detection apparatus according to an embodiment of the present invention.

FIG. 14 is a schematic structural diagram of Embodiment 4 of a mobile communications network detection apparatus according to an embodiment of the present invention. As shown in FIG. 14, the user equipment in this embodiment includes a receiver 141 and a processor 142. Optionally, the user equipment may further include a memory 143. The receiver 141, the processor 142, and the memory 143 may be connected by using a system bus or in other manners. In FIG. 14, connection by using the system bus is used as an example. The system bus may be an industry standard architecture (ISA) bus, a peripheral component interconnect (PCI) bus, an Extended Industry Standard Architecture (EISA) bus or the like. The system bus may be classified into an address bus, a data bus, a control bus, and the like. For ease of illustration, in FIG. 14, only one line is used, which does not indicate that there is only one bus or only one type of bus.

The receiver 141 is configured to receive quality of service information sent by multiple network element devices on a transmission path of a service data flow, where the quality of service information is used for indicating quality of service of transmission of the service data flow by the network element devices, and the multiple network element devices include a base station device and a core network device.

The processor 142 is configured to determine quality of service of the transmission path of the service data flow according to the quality of service information that is sent by the multiple network element devices and received by the receiver 141.

The memory 143 is configured to store information received by the receiver 141, and store data processed by the processor 142.

The mobile communications network detection apparatus in this embodiment is configured to execute the technical solution in the method embodiment shown in FIG. 6, and has the same implementation principle and technical effect as the method embodiment, and details are not described again herein.

Further, in the embodiment shown in FIG. 14, when the service data flow is an uplink data flow, the quality of service information sent by the base station device is quality of service information of a received PDCP data packet carrying the service data flow.

Further, in the embodiment shown in FIG. 14, when the service data flow is a downlink data flow, the quality of service information sent by the base station device is quality of service information of a received GTP data packet carrying the service data flow and quality of service information of a sent PDCP data packet carrying the service data flow.

Further, in the embodiment shown in FIG. 14, the quality of service information sent by the core network device is the quality of service information of the received GTP data packet carrying the service data flow.

Further, in the embodiment shown in FIG. 14, when the service data flow is an uplink data flow, the quality of service information sent by the base station device and the core network device is quality of service information of a received data packet that is of a service protocol and carries the service data flow, where the service protocol is based on a service attribute of the service data flow.

Further, in the embodiment shown in FIG. 14, when the service data flow is a downlink data flow, the quality of service information sent by the base station device is quality of service information of received and sent data packets that are of the service protocol and carry the service data flow, and the quality of service information sent by the core network device is quality of service of the received data packet that is of the service protocol and carries the service data flow, where the service protocol is based on a service attribute of the service data flow.

Further, in the embodiment shown in FIG. 14, the service protocol includes the RTP.

Further, in the embodiment shown in FIG. 14, the processor 142 is specifically configured to determine, according to the quality of service information that is sent by the multiple network element devices and received by the receiver 141, a network element device having the lowest quality of service in the transmission path of the service data flow.

Further, in the embodiment shown in FIG. 14, the processor 142 is further configured to generate a statistical diagram according to the quality of service information that is sent by the multiple network element devices and received by the receiver 141, where the statistical diagram is used for indicating a change situation of the quality of service of the transmission path.

Figure 15:
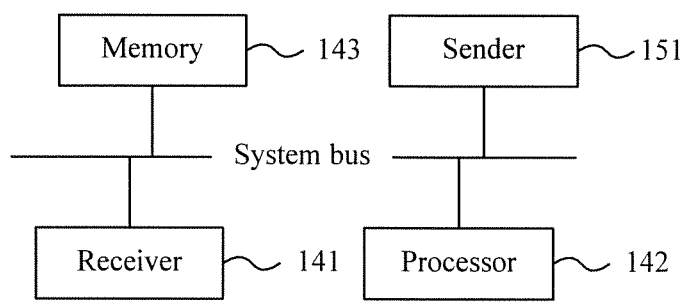
FIG. 15 is a schematic structural diagram of Embodiment 5 of a mobile communications network detection apparatus according to an embodiment of the present invention.

FIG. 15 is a schematic structural diagram of Embodiment 5 of a mobile communications network detection apparatus according to an embodiment of the present invention. As shown in FIG. 15, based on FIG. 14, the mobile communications network detection apparatus in this embodiment further includes:

a sender 151, configured to send detection indication information to the multiple network element devices, where the detection indication information is used for indicating detection of the quality of service of the transmission of the service data flow by the network element devices.

Further, in the embodiment shown in FIG. 15, the sender 151 is specifically configured to send end-to-end trace session activation signaling to a network control network element, where the end-to-end trace session activation signaling includes the detection indication information, so that the network control network element sends the detection indication information to the multiple network element devices; or send end-to-end trace session activation signaling to a home subscriber server, so that after the home subscriber server sends the detection indication information to a network control network element, the network control network element sends the detection indication information to the multiple network element devices.

Further, in the embodiment shown in FIG. 15, the end-to-end trace session activation signaling further includes information about a network element device to be detected, so that the network control network element sends the detection indication information to the network element device to be detected.

Further, in the embodiment shown in FIG. 15, the end-to-end trace session activation signaling further includes a job type information element, and the job type information element is used for instructing the multiple network element devices to send a trace signaling message and/or the detection indication information to the network element management device.

Further, in the embodiments shown in FIG. 14 and FIG. 15, the core network device includes a serving gateway and a data gateway.

Further, in the embodiments shown in FIG. 14 and FIG. 15, the quality of service information includes a packet loss rate, jitter, latency or a MOS value of a data packet.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A mobile communications network detection method, the method comprising:
receiving, by a network element management device, quality of service information sent by multiple network element devices on a transmission path of a service data flow, wherein the quality of service information is used for indicating quality of service of transmission of the service data flow by the network element devices, and the multiple network element devices comprise a base station device and a core network device;
determining, by the network element management device, quality of service of the transmission path of the service data flow according to the quality of service information sent by the multiple network element devices; and
sending, by the network element management device, detection indication information to the multiple network element devices for indicating detection of the quality of service of the transmission of the service data flow by the network element devices, wherein sending the detection indication information comprises:
sending, by the network element management device, end-to-end trace session activation signaling to a network control network element, wherein the end-to-end trace session activation signaling comprises the detection indication information for enabling the network control network element to send the detection indication information to the multiple network element devices.

2. The method according to claim 1, wherein determining, by the network element management device, the quality of service of the transmission path of the service data flow according to the quality of service information sent by the multiple network element devices comprises:
determining, by the network element management device according to the quality of service information sent by the multiple network element devices, a network element device having the lowest quality of service on the transmission path of the service data flow.

3. The method according to claim 1, further comprising:
generating, by the network element management device, a statistical diagram according to the quality of service information sent by the multiple network element devices, wherein the statistical diagram is used for indicating a change situation of the quality of service of the transmission path.

4. A mobile communications network detection method, the method comprising:
receiving, by a network element management device, quality of service information sent by multiple network element devices on a transmission path of a service data flow, wherein the quality of service information is used for indicating quality of service of transmission of the service data flow by the network element devices, and the multiple network element devices comprise a base station device and a core network device;
determining, by the network element management device, quality of service of the transmission path of the service data flow according to the quality of service information sent by the multiple network element devices; and
sending, by the network element management device, detection indication information to the multiple network element devices for indicating detection of the quality of service of the transmission of the service data flow by the network element devices, wherein sending the detection indication information comprises:
sending, by the network element management device, end-to-end trace session activation signaling to a home subscriber server for enabling the home subscriber server to send the detection indication information to a network control network element, enabling the network control network element to send the detection indication information to the multiple network element devices.

5. The method according to claim 4, wherein the end-to-end trace session activation signaling further comprises information about a network element device to be detected for enabling the network control network element to send the detection indication information to the network element device to be detected.

6. The method according to claim 4, wherein the end-to-end trace session activation signaling further comprises information about a network element device to be detected for enabling the network control network element to send the detection indication information to the network element device to be detected.

7. A mobile communications network detection apparatus, comprising:
a receiver, configured to receive quality of service information sent by multiple network element devices on a transmission path of a service data flow, wherein the quality of service information is used for indicating quality of service of transmission of the service data flow by the network element devices, and the multiple network element devices comprise a base station device and a core network device;
a processor, configured to determine quality of service of the transmission path of the service data flow according to the quality of service information sent by the multiple network element devices; and
a transmitter, configured to:
send detection indication information to the multiple network element devices for indicating detection of the quality of service of the transmission of the service data flow by the network element devices, and
send end-to-end trace session activation signaling to a network control network element, wherein the end-to-end trace session activation signaling comprises the detection indication info' cation for enabling the network control network element to send the detection indication information to the multiple network element devices.

8. The mobile communications network detection apparatus according to claim 7, wherein when the service data flow is an uplink data flow, the quality of service information sent by the base station device is quality of service information of a received Packet Data Convergence Protocol (PDCP) data packet carrying the service data flow.

9. The mobile communications network detection apparatus according to claim 7, wherein when the service data flow is a downlink data flow, the quality of service information sent by the base station device is quality of service information of a received general packet radio service tunneling protocol (GTP) data packet carrying the service data flow and quality of service information of a sent PDCP data packet carrying the service data flow.

10. The mobile communications network detection apparatus according to claim 7, wherein the quality of service information sent by the core network device is the quality of service information of the received GTP data packet carrying the service data flow.

11. The mobile communications network detection apparatus according to claim 7, wherein when the service data flow is an uplink data flow, the quality of service information sent by the base station device and the core network device is quality of service information of a received data packet that is of a service protocol and carries the service data flow, wherein the service protocol is based on a service attribute of the service data flow.

12. The mobile communications network detection apparatus according to claim 7, wherein when the service data flow is a downlink data flow, the quality of service information sent by the base station device is quality of service information of received and sent data packets that are of the service protocol and carry the service data flow, and the quality of service information sent by the core network device is quality of service information of the received data packet that is of the service protocol and carries the service data flow, wherein the service protocol is based on a service attribute of the service data flow.

13. The mobile communications network detection apparatus according to claim 11, wherein the service protocol comprises a Real-Time Transport Protocol (RTP).

14. The mobile communications network detection apparatus according to claim 7, wherein the processor is configured to determine, according to the quality of service information sent by the multiple network element devices, a network element device having the lowest quality of service on the transmission path of the service data flow.

15. The mobile communications network detection apparatus according to claim 7, wherein the processor is further configured to generate a statistical diagram according to the quality of service information sent by the multiple network element devices, wherein the statistical diagram is used for indicating a change situation of the quality of service of the transmission path.

16. The mobile communications network detection apparatus according to claim 7, wherein the core network device comprises a serving gateway and a data gateway.

17. A mobile communications network detection apparatus, comprising:
a receiver, configured to receive quality of service information sent by multiple network element devices on a transmission path of a service data flow, wherein the quality of service infatuation is used for indicating quality of service of transmission of the service data flow by the network element devices, and the multiple network element devices comprise a base station device and a core network device;
a processor, configured to determine quality of service of the transmission path of the service data flow according to the quality of service information sent by the multiple network element devices; and
a transmitter, configured to:
send detection indication information to the multiple network element devices for indicating detection of the quality of service of the transmission of the service data flow by the network element devices, and
send end-to-end trace session activation signaling to a home subscriber server for enabling the home subscriber server to send the detection indication information to a network control network element, enabling the network control network element to send the detection indication information to the multiple network element devices.

18. The mobile communications network detection apparatus according to claim 17, wherein the end-to-end trace session activation signaling further comprises information about a network element device to be detected for enabling the network control network element to send the detection indication information to the network element device to be detected.

19. The mobile communications network detection apparatus according to claim 17, wherein the end-to-end trace session activation signaling further comprises a job type information element for instructing the multiple network element devices to send a trace signaling message and/or the detection indication information to the mobile communications network detection apparatus.

20. The mobile communications network detection apparatus according to claim 17, wherein the end-to-end trace session activation signaling further comprises information about a network element device to be detected for enabling the network control network element to send the detection indication information to the network element device to be detected.

* * * * *